United States Patent
Lambert et al.

(10) Patent No.: US 7,565,408 B2
(45) Date of Patent: Jul. 21, 2009

(54) INFORMATION HANDLING SYSTEM INCLUDING A LOCAL REAL DEVICE AND A REMOTE VIRTUAL DEVICE SHARING A COMMON CHANNEL

(75) Inventors: Timothy Lambert, Austin, TX (US);
Paul W. Vancil, Austin, TX (US);
Richard Waldorf, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 829 days.

(21) Appl. No.: 10/393,222

(22) Filed: Mar. 20, 2003

(65) Prior Publication Data

US 2004/0186837 A1    Sep. 23, 2004

(51) Int. Cl.
*G06F 15/16* (2006.01)

(52) U.S. Cl. .................. 709/217; 709/203; 709/208; 709/213; 709/214; 709/250; 711/111; 703/23

(58) Field of Classification Search .......... 709/214, 709/218, 231, 223, 208, 217, 246, 203, 213, 709/250; 714/11, 17; 711/111, 115; 703/13, 703/21, 23, 24; 370/351, 357; 710/1, 62, 710/74, 305
See application file for complete search history.

(56) References Cited

U.S. PATENT DOCUMENTS

| | | | | |
|---|---|---|---|---|
| 5,581,542 A | * | 12/1996 | Kato et al. | 370/276 |
| 5,675,723 A | * | 10/1997 | Ekrot et al. | 714/17 |
| 6,195,650 B1 | | 2/2001 | Gaither et al. | |
| 6,266,785 B1 | * | 7/2001 | McDowell | 714/11 |
| 6,381,615 B2 | | 4/2002 | Gaither et al. | |
| 6,421,711 B1 | | 7/2002 | Blumenau et al. | |
| 6,650,749 B1 | * | 11/2003 | Laulo | 379/279 |
| 6,874,060 B2 | * | 3/2005 | Blood et al. | 711/111 |
| 6,901,075 B1 | * | 5/2005 | Baron | 709/231 |
| 2002/0049778 A1 | * | 4/2002 | Bell et al. | 707/200 |
| 2003/0028731 A1 | * | 2/2003 | Spiers et al. | 711/147 |
| 2003/0061401 A1 | * | 3/2003 | Luciani, Jr. | 709/324 |
| 2003/0229694 A1 | * | 12/2003 | Tsai et al. | 709/223 |
| 2005/0289218 A1 | * | 12/2005 | Rothman et al. | 709/203 |
| 2007/0005821 A1 | * | 1/2007 | Diamant | 710/15 |

* cited by examiner

*Primary Examiner*—Ramy Mohamed Osman
(74) *Attorney, Agent, or Firm*—Haynes and Boone, LLP

(57) ABSTRACT

A remote management system is coupled to a target information handling system so that a virtual device on the remote system can transmit information such as software, data, applications and upgrades to the target system. The target system includes a local real device such as a media drive which is switchably coupled to a channel of the target system. Upon command from the remote management system the target system switches the channel from a connection with the local real device to a connection with the remote virtual device. Software installations by a remote operator at the remote system are thus facilitated. In this manner the channel is shared between the local real device and the remote virtual device.

24 Claims, 3 Drawing Sheets

INFORMATION HANDLING SYSTEM INCLUDING A LOCAL REAL DEVICE AND A REMOTE VIRTUAL DEVICE SHARING A COMMON CHANNEL

BACKGROUND

The disclosures herein relate generally to information handling systems and more particularly to a target information handling system which provides device virtualization of a device actually located in a remote information handling system. In such systems the device in the remote system appears to the target system as though it were a device located in the target system.

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include storage devices to retain data for use by such systems. For example, these systems can include media drives such as hard disk drives, floppy disk drives, CD ROM drives, DVD drives as well as other varieties of fixed and removable storage media. Many of today's computer systems employ integrated drive electronics (IDE) channels to couple these drives or devices to the system. Such a computer system typically includes both a primary channel and a secondary channel, each of which is capable of receiving a master and slave device.

In the enterprise environment as well as other environments, it is sometimes necessary to perform operating system upgrades, application software upgrades and application software installations on a target computer system from a remote computer system. The target computer system is usually coupled to the remote computer system via a network connection. It is often desirable that an information technology (IT) professional at the remote system perform such an upgrade/installation to the target computer system. This simplifies maintenance of the target system for the user of the target system. In this situation it is desirable that a device, such as a CD ROM drive or disk drive, physically present in the remote computer system appear as a virtual device in the target computer system. In this manner it can appear to the operating system of the target computer system that the remote device with the desired upgrade/installation software is virtually present in the target computer system.

Unfortunately in the above described scenario, a full IDE channel including both master and slave ports must be dedicated to a remote media drive which is virtually coupled to the target computer system. Providing an additional IDE channel for this purpose drives up system cost and adds to design complexity.

Therefore, what is needed is a way to avoid dedicating an entire channel to a remote media drive when the remote media drive is virtually coupled to the target computer system.

SUMMARY

Accordingly, in one embodiment, an information handling system is provided wherein the information handling system includes a processor and a memory coupled to the processor. The system also includes a first channel coupled to the processor. The system further includes a real storage device. The system still further includes a switch, coupled to the first channel, for switching between the real storage device and a network connected virtual storage device which is remote to the system. In this manner, sharing of the first channel between the real storage device and the virtual storage device is achieved.

A principal advantage of the embodiment disclosed herein is that channels are conserved by sharing a channel between a real storage device such as a local physical drive and a virtual storage device such as a remote virtual drive. The need for a dedicated channel for remote virtual devices is thus avoided.

DETAILED DESCRIPTION

Figure 1:
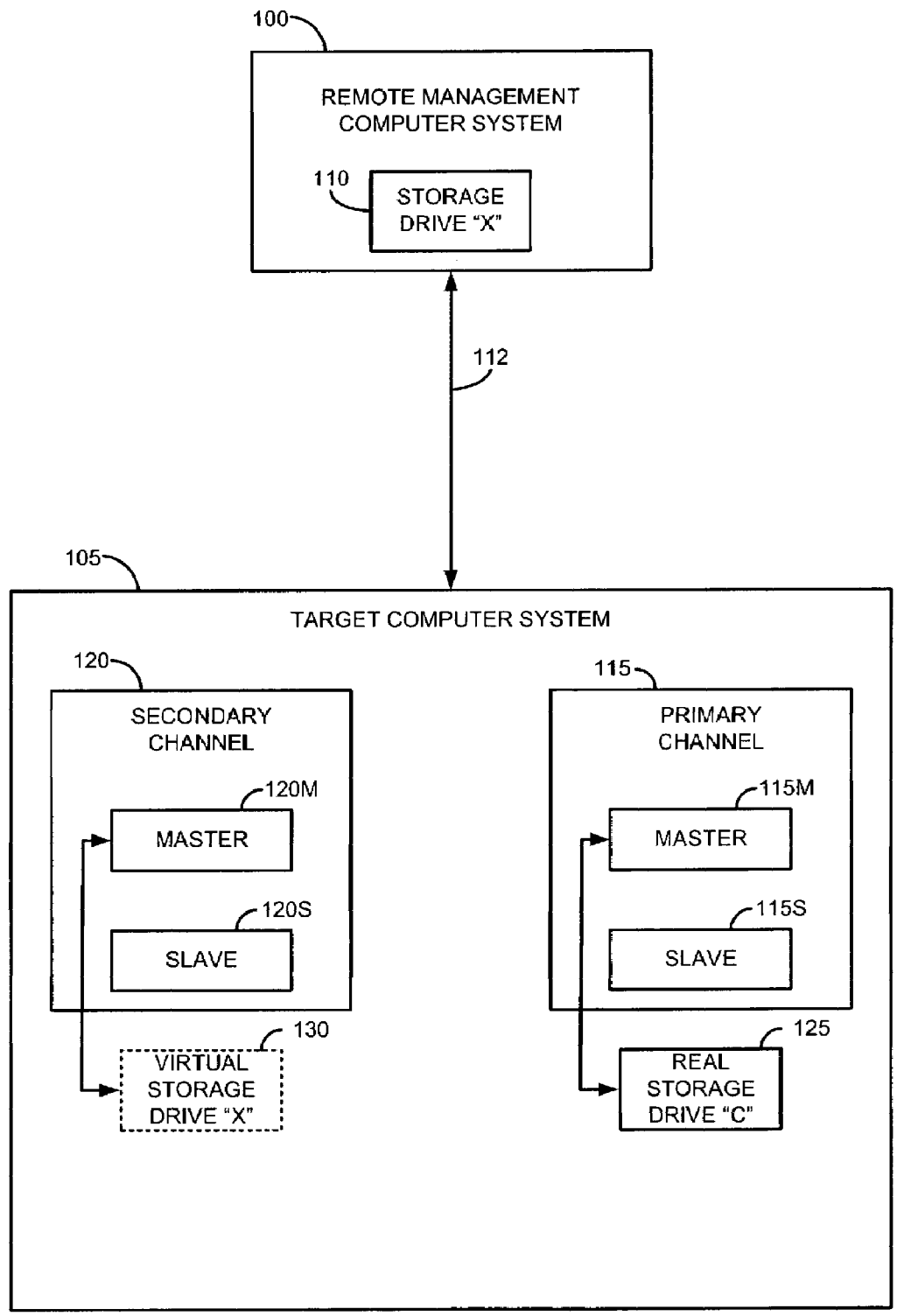
FIG. 1 is a block diagram illustrating a conventional remote management system coupled to a target computer system to which data is to be transferred over a network.

FIG. 1 is a block diagram which illustrates in more detail the problem to be solved. An IT professional at a remote management computer system 100 is tasked with performing a software upgrade to a target computer system 105. Computer system 105 may be one of hundreds of computer systems requiring an upgrade. To physically walk to each computer system requiring an upgrade would truly be a daunting task. This difficulty provides motivation for performing such an upgrade from a common remote location such as the location of the remote management system 100. Remote management system 100 is a conventional information handling system including a media drive or storage drive 110 on which upgrade software is stored. Storage drive 110, also designated storage drive X, is conveniently a CD ROM drive, a DVD drive, or alternatively, fixed storage containing is the upgrade software. Remote management system 100 is coupled to target computer system 105 via network 112.

The target computer system 105 includes a primary IDE storage channel 115 including master and slave ports, 115M and 115S, respectively. Target computer system 105 also includes a secondary IDE storage channel 120 including master and slave ports, 120M and 120S, respectively. A storage drive C, designated as drive 125, is coupled to master port 115M of primary channel 115. Drive 125 is a real drive in the sense that it is a drive actually physically present in target computer system 105.

In this situation it is desirable that it appears to target computer system 105 as though the installation upgrade software on storage drive 110 ("X") is present in target computer system 105. This is achieved by mapping storage drive 110 ("X") so that it appears to an operating system of target computer system 105 that drive "X" is present within target computer system 105 as a virtual drive, namely virtual storage drive 130 ("X") which is shown in dashed lines. In this scenario, virtual storage drive 130 may also be called a logical drive since it is not actually physically present within target computer system 105.

When a remote drive is virtualized on a local target computer system in the above described manner, unfortunately a full channel must be dedicated to the virtual storage drive. Thus, in target computer system 105 of FIG. 1, because master port 120M of secondary channel 120 has the virtual storage drive 130 ("X") mapped thereto, the remaining empty slave port 120S can not be used by another device. Moreover, because real storage drive "C" (drive 125) is coupled to master port 115M of primary channel 115, the remaining empty slave port 115S can not be used for a virtual drive. Again, this is true because a virtual drive requires a dedicated channel. Thus, virtualizing a drive in the target computer system in this manner results in the added expense of another port that is dedicated to this purpose.

Figure 2:
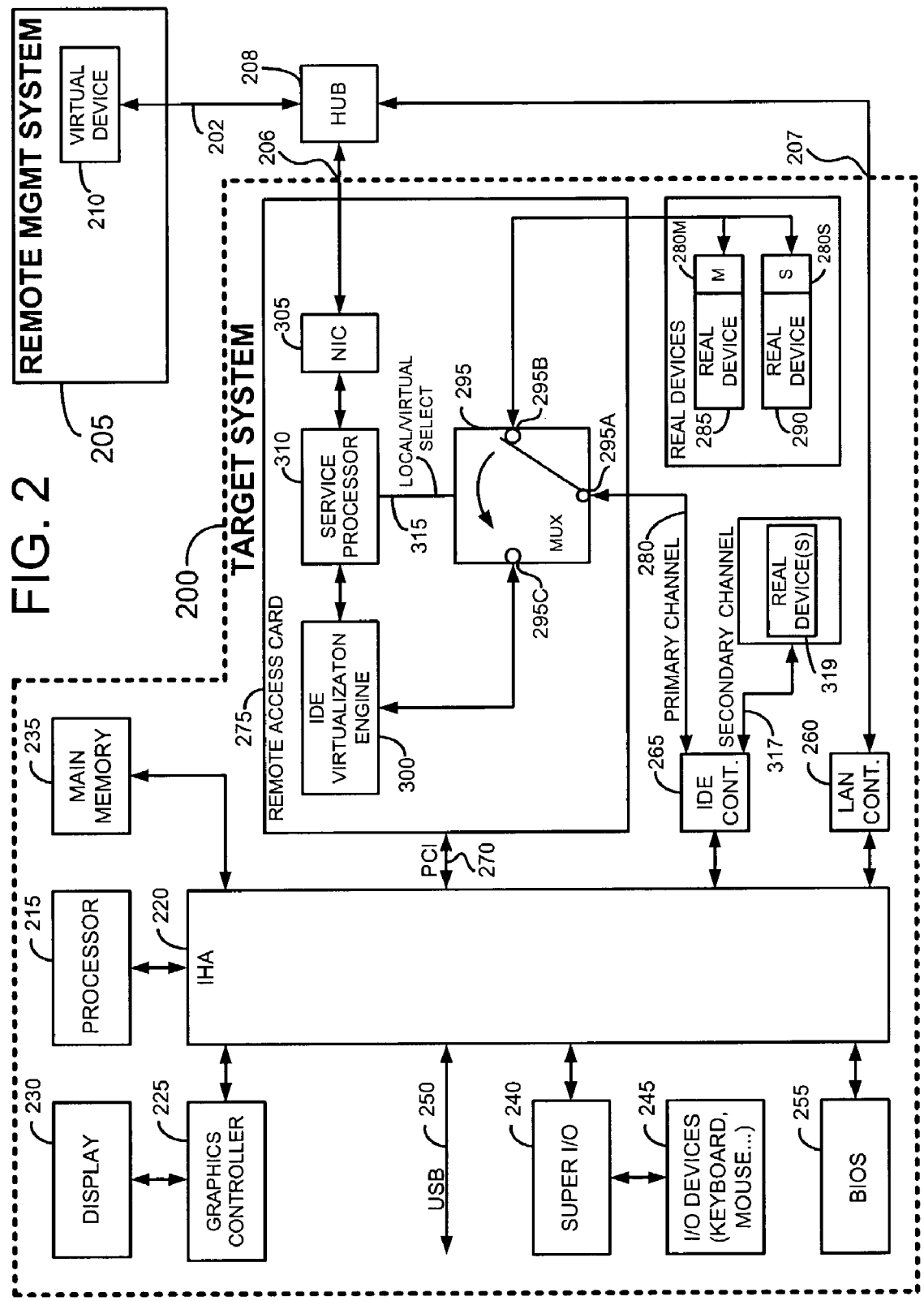
FIG. 2 is a block diagram of an embodiment of an information handling system which solves the problems associated with the systems of FIG. 1.

FIG. 2 depicts a local information handling system or target computer system 200 which solves this problem with a virtualization apparatus that permits sharing a common channel between a real device and a virtual device. A real device may also be referred to as a real storage device and a virtual device may also be referred to as a virtual storage device. Target computer system 200 is coupled by a network 202 to a remote management system 205. In this particular embodiment, target computer system 200 includes network ports 206 and 207 which are coupled via hub 208 and network 202 to remote management system 205. Network 202 is an Internet Protocol (IP) network employing Transmission Control Protocol (TCP) to establish a connection between destination and source. Other networking protocols can be used if desired. Network port 206 will provide a logical path between remote management system 205 and target computer system 200.

Remote management system 205 includes a media drive device which is to be virtualized in target computer system 200. This media drive device is labeled as virtual device 210 in FIG. 2. It is noted that while virtual device 210 is virtual with respect to target system 200, it is a real physical drive device with respect to remote management system 205.

Target computer system 200 is an example of one information handling system in which the disclosed technology is practiced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. It is noted that remote management system 205 is also such an information handling system.

The particular target computer system 200 or particular information handling system depicted in FIG. 2 is a desktop or portable computer which includes a processor 215 such as an Intel Pentium series processor or one of many other processors currently available. An Intel Hub Architecture (IHA) chipset 220 provides target computer system 200 with graphics/memory controller hub functions and I/O functions. More specifically, IHA chipset 220 acts as a host controller which communicates with a graphics controller 225 coupled thereto. A display 230 is coupled to graphics controller 225. Chipset 220 further acts as a controller for main memory 235 which is coupled thereto. IHA chipset 220 also acts as an I/O controller hub (ICH) which performs I/O functions. A super input/output (I/O) controller 240 is coupled to chipset 220 to provide communications between chipset 220 and input devices 245 such as a mouse, keyboard, and tablet, for example. In one embodiment, a universal serial bus (USB) 250 is coupled to chipset 220 to facilitate the connection of peripheral devices to system 200. System basic input-output system (BIOS) 255 is coupled to chipset 220 as shown.

A local area network (LAN) controller 260, alternatively called a network interface controller (NIC), is coupled between chipset 220 and network port 207. Target computer system 200 is thus provided with a communications path to remote management system 205. Another communications path to remote management system 205 is provided by network port 206 as described later in more detail. Integrated drive electronics (IDE) controller 265 is coupled to chipset 220 so that devices such as media drives can be connected to chipset 220 and processor 215. Devices that can be thus coupled via IDE controller include CD-ROMs, DVD's, hard disk drives and other fixed or removable media drives.

An expansion bus 270, such as a Peripheral Component Interconnect (PCI) bus, is coupled to chipset 220 as shown. Expansion bus 265 includes one or more expansion slots (not shown) for receiving expansion cards which provide target computer system 200 with additional functionality. One such expansion card is the remote access card (RAC) 275. The purpose of remote access card 275 is to permit virtual device 210, which is physically located in remote management system 205, to share a common channel with one or more real devices physically located in target system 200. In the particular example of FIG. 2, primary storage channel 280 is so shared. Primary channel 280 includes a master port 280M to which a real device 285, for example a media drive, is connected. A computer operating system, programs and other data are conveniently stored in such a media drive. Primary channel 280 also includes a slave port 280S to which a real device 290, for example a media drive, is connected.

Remote access card 275 includes a multiplex switch (MUX) 295. The common terminal 295A of MUX switch 295 is coupled to the primary channel 280 of IDE controller 265 as shown. Switch terminal 295B is coupled to master port 280M and slave port 280S. Switch terminal 295C is coupled to IDE virtualization engine 300 in remote access card 275. IDE virtualization engine 300 makes it appear to IDE controller 265 and the operating system that the media drive or virtual device 210 in remote management system 205 is within target system 200 when MUX 295 is appropriately switched as discussed later in more detail. IDE virtualization engine 300 is coupled via service processor 310 to a network interface controller (NIC) 305 and to network 202 as shown.

More detail is now provided regarding how a real device 285 in target system 200 and a virtual device 210 in remote management system 205 share a common channel 280 in target system 200. When processor 215 is initialized, MUX switch 295 is in the position shown, namely common terminal 295A is coupled to terminal 295B. In this position, IDE controller 265 is connected to real device 285 and remote access card 270 is thus said to be operating in "real mode". Operation in this real mode is as though remote access card 270 were not present in target system 200 because IDE controller 265 is effectively directly connected to real devices 285 and 290. However, when MUX switch 295 is switched such that common terminal 295A is coupled to terminal 295C, then operation in "virtual mode" commences. In the virtual mode, virtual device 210 in remote management system 205 is effectively coupled to IDE controller 265. A media drive employed as virtual device 210 will now appear to IDE controller 265 as though it were physically present in target system 200. Accordingly, information on virtual device 210 can be conveniently accessed by target system 200 to install software, update or upgrade software or otherwise transfer information from remote management system 205 to target system 200.

Additional information regarding how this virtual mode is engaged and operates is now provided. To engage virtual mode, an operator at remote management system 205 sends a "switch to virtual mode" command over network 202 to target system 200. The "switch to virtual mode" command is a remote command because it is remote in the sense that it is transmitted by remote management system 205. This command is received by a network interface controller (NIC) 305 which sends the command to a service processor 310 coupled to network interface 305. Service processor 310 is an "out-of-band" processor in that it operates independent of processor 215 and the operating system installed on target system 200. Service processor 310 is implemented as an application specific integrated circuit (ASIC) in one embodiment. Service processor 310 is coupled via a LOCAL/VIRTUAL SELECT line 315 to MUX switch 295. When service processor 310 receives a "switch to virtual mode" command, it toggles LOCAL/VIRTUAL SELECT line 315 to cause MUX switch 295 to now connect IDE virtualization engine 300 via terminal 295C to terminal 295A and IDE controller 265. IDE virtualization engine 300 is now in a position to convert information packets received from virtual device 210 in remote management system 205 to equivalent IDE commands and data which are understood by IDE controller 265. To IDE controller 265 it now appears that virtual device 210 is directly connected to IDE controller 265 as though it were a real device physically present in target computer system 200. When service processor 310 instructs switch 295 to return the connection of terminal 295A back to terminal 295B, then target computer system 200 returns to the real mode in which real devices 285 and 290 are connected to IDE controller 265. Real mode is the default mode in which target system 200 operates. It is noted that when virtual mode is enabled, real mode is disabled. In other words, when operating in virtual mode virtual device 210 in remote management system 205 is coupled to IDE controller 265 and real devices 285 and 290 in primary channel 280 are disconnected therefrom.

Virtualization engine 300 interprets information received from virtual device 210 via network 202 and service processor 310 into a format which is recognized by channel 280. Virtualization engine 300 includes logic and protocols to emulate a generic IDE device. Thus, the media being virtualized is not limited to any particular type of device. Virtualization engine 300 emulates a generic IDE device to IDE controller 265. In other words, virtualization engine takes the commands and data received from virtual device 210 and converts those commands and data into a format which is understandable to an industry standard media controller such as IDE controller 265. Since virtualization engine 300 emulates a generic IDE device, writes back to virtual device 210 are also possible. While service processor 310 and virtualization engine 300 are shown as separate elements in FIG. 2, it is possible to combine these two elements in a common structure if desired.

In this particular embodiment, target computer system 200 includes a secondary storage channel 317 which includes one or more real devices such as real device 319 for example. Like real devices 285 and 290, a computer operating system, programs and other data can be stored in real device 319.

Figure 3:
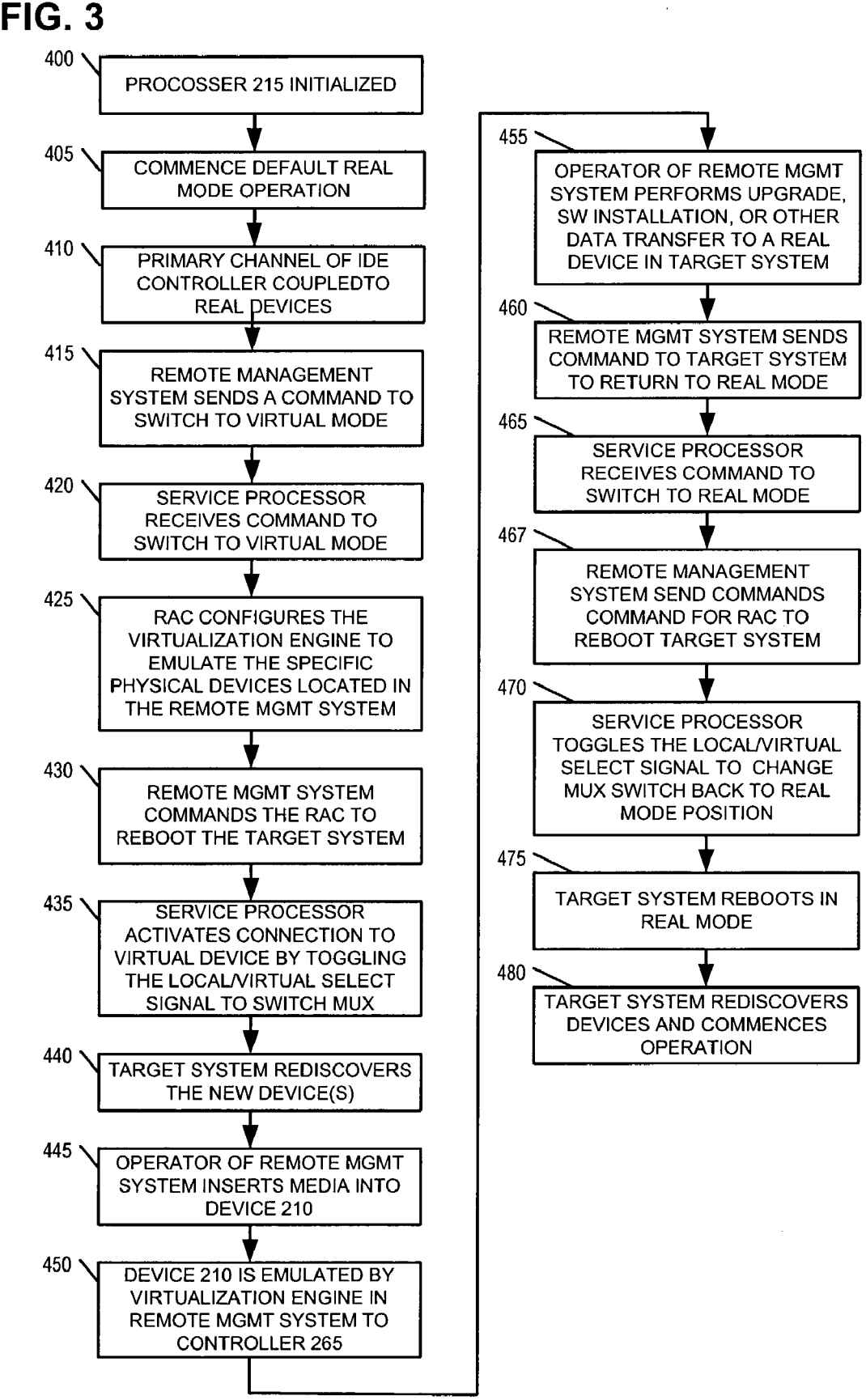
FIG. 3 is a flow chart showing an embodiment of process flow of the information handling system of FIG. 2.

FIG. 3 is a flowchart showing the process flow of target computer system 200 as it responds to commands to operate in real mode and virtual mode. Processor 215 of target computer system 200 is initialized as per block 400. The operating system of target computer system 200 boots and system 200 commences operation in the previously described real mode as per block 405. The remote access card 275 defaults upon initialization to the real mode wherein MUX switch 295 connects primary channel 280 of IDE controller 265 to real devices 285 and 290 as per block 410. Real mode may also be referred to as pass-through mode since data and control signals from IDE controller 265 pass directly through remote access card 275 to real devices 285 and 290. The control and data signals from IDE controller 265 are not modified by remote access card 270 in real mode since it is effectively a pass-through mode of operation.

An operator, IT professional or other person at remote management system 205 instructs system 205 to send a switch mode command to target system 200 as per block 415. The switch mode command instructs the remote access card 275 of target computer system 200 to switch form real mode to virtual mode. Service processor 310 receives the switch mode command as per block 420 and in response RAC 275 configures IDE virtualization engine 300 to emulate the specific physical devices, i.e. real media devices, located in the remote management system as per block 425. For example, virtualization engine 300 will emulate one or more virtual devices 210 depending on the number of devices employed in remote management system 205. For simplicity in this example, it is assumed that remote management system 205 includes one device 210 which is to be virtualized in target system 200.

Remote management system 205 then sends a command to target system 200 instructing target system 200 to reboot as per block 430. This command is received by service processor 310 which in response instructs system 200 to reboot. Service processor 310 then toggles LOCAL/VIRTUAL SELECT line 315 which switches MUX switch 295 to activate the connection of virtual device 210 to primary channel 280 of IDE controller 265 as per block 435. As per block 440, target system 200 rediscovers new devices, namely virtual device 210 in this example, as the operating systems loads. The operator, IT professional or other user of remote management system 205 inserts media into device 210 as per block 445. This media, such as a CD ROM or DVD, includes the software or other information which is intended to be transferred to target system 200. It is also possible that rather than the virtual device accepting removable media, it may be a fixed media device which has already stored the software or other information which is to be transferred to target system 200. Device 210 is then emulated by virtualization engine 300 to IDE controller 265 such that it appears to controller 265 that device 210 is present in target system 200 as per block 450. The operator of remote management system 205 then performs the application software installation or upgrade, operating system installation or upgrade, or data or other information transfer to a real device in target system 200 as per block 455. For example this information transfer is made to real device 319 in secondary channel 317 as per block 455. The remote management system 205 then sends a command over network 202 to service processor 310 instructing target system 200 to return to real mode as per block 460. Service processor 310 receives this return to real mode command as per block 465. Remote management system 205 sends a command instructing RAC 275 to initiate a reboot as per block 467. Switch 295 returns to the real mode position as per block 470. It will be recalled that in real mode the primary channel 280 IDE controller 265 will now be again coupled directly to real devices 285 and 290. Target system 200 then reboots in real mode upon command from remote management system 210 as per block 475. Subsequently, target system 200 rediscovers the real devices connected thereto and target system 200 commences operation as per block 480.

While in the specific embodiment described above with reference to FIG. 2 the real and virtual devices employ the IDE interface standard, the disclosed technology applies as well to other interface standards as well. For example, IDE controller 265 and devices 210, 285, 290 and 317 may employ the serial ATA (i.e. SATA) standard. The disclosed technology is especially useful when applied to interface standards which are resource constrained in terms of it being expensive to add more channels to a target system. By employing the disclosed technology, you need not burden the system with the cost associated with adding another channel or controller that is only used rarely for system updates from a remote system. In the example discussed above, primary channel 280 includes 2 ports. It should be noted that the disclosed technology is applicable as well to channels including more than two ports.

It is also noted that remote management system 205 is remote with respect to target system 200 in the sense that it is some distance from target system 200. However this distance could be very small. Remote management system 205 could be in a distant city with respect to target system or systems 200. Alternatively, remote management system 205 could be in the same room or building with hundreds of target systems 200 which need software upgrades, installations, or reinstallation of software to enable disaster recovery.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. An information handling system (IHS) comprising:
   a processor;
   a memory coupled to the processor;
   a virtual storage device included in a remote management system coupled to the IHS;
   a real storage device in the IHS;
   a first channel coupled to the processor and shared by the real and virtual storage devices;
   a multiplex switch, coupled to the first channel, for switching, via a remote command, to provide operation between a real mode and a virtual mode, the switch coupling a controller with the real storage device when operating in the real mode, and coupling the controller to the virtual storage device when operating in the virtual mode, whereby information on the virtual storage device can be accessed by the IHS to transfer the information from the remote management system to the IHS, wherein the remote management system causes the IHS to reboot when switching between the real mode and the virtual mode; and
   a virtualization engine operable to convert information between the virtual storage device and the controller whereby communication between the virtual storage device and the controller simulates communication from a real storage device physically present in the IHS.

2. The IHS of claim 1 further comprising:
   a network port for coupling to the network connected virtual storage device.

3. The IHS of claim 1 wherein the first channel is a primary channel.

4. The IHS of claim 1 the first channel is a storage channel.

5. The IHS of claim 1 further comprising:
   a second channel coupled to the processor.

6. The IHS of claim 5 wherein the second channel is a storage channel.

7. The IHS of claim 1 including a network port through which the remote management system including the virtual storage device is connected to the information handling system.

8. The IHS of claim 7 including a service processor for receiving a command from the remote management system and in response activating the switch to connect the virtual storage device to the first channel.

9. The IHS of claim 8, wherein the virtualization engine is coupled between the service processor and the switch, the virtualization engine interpreting information from the remote management system to a generic format recognized by the first channel.

10. The IHS of claim 9 wherein the information is an application stored in the virtual device.

11. The IHS of claim 9 wherein the information is an application upgrade stored in the virtual device.

12. The IHS of claim 9 wherein the information is an operating system stored in the virtual device.

13. The IHS of claim 9 wherein the information is an operating system upgrade stored in the virtual device.

14. The IHS of claim 9 wherein the switch, service processor, and virtualization engine are situated on a remote access expansion card in the information handling system.

15. A method of operating a local information handling system (IHS) including a channel to facilitate information installation by a remote management system, the method comprising:
   providing the local IHS with a processor, and a memory coupled to the processor;
   providing the remote management system coupled to the IHS and including a virtual storage device in the remote management system;
   providing a real storage device in the IHS;
   coupling a primary channel to the processor, the first channel being shared by the real and virtual storage devices;
   coupling a multiplex switch to the primary channel to provide operation between a real mode and a virtual mode, the switch, switchable via a remote command, coupling a controller with the real storage device when operating in the real mode, and coupling the controller to the virtual storage device when operating in the virtual mode, whereby information on the virtual storage device can be accessed by the IHS to transfer the information from the remote management system to the IHS, wherein the remote management system causes the IHS to reboot when switching between the real mode and the virtual mode; and providing a virtualization engine operable to convert information between the virtual storage device and the controller whereby communication between the virtual storage device and the controller simulates communication from a real storage device physically present in the IHS.

16. The method of claim 15 including the remote management system installing information on the local IHS.

17. The method of claim 16 wherein the information is an application.

18. The method of claim 16 wherein the information is an application upgrade.

19. The method of claim 16 wherein the information is an operating system.

20. The method of claim 16 wherein the information is an operating system upgrade.

21. The method of claim 16 wherein the information is data.

22. The method of claim 15 including the remote management system installing information on the local information handling system to achieve disaster recovery.

23. The method of claim 15 wherein the remote management system sends a reboot command to the local IHS after the switching in the receiving step.

24. The method of claim 15 including coupling the remote management system to the local IHS by a network.

* * * * *